(12) United States Patent
Aposhian et al.

(10) Patent No.: US 8,978,779 B2
(45) Date of Patent: Mar. 17, 2015

(54) ARTICULATED CUTTING HEAD AND CONVEYOR MOUNT FOR SOD HARVESTING MACHINES

(71) Applicants: Steven R. Aposhian, Farmington, UT (US); Eric E. Aston, Salt Lake City, UT (US); William M. Decker, Salt Lake City, UT (US); Samuel Drake, Cottonwood Heights, UT (US)

(72) Inventors: Steven R. Aposhian, Farmington, UT (US); Eric E. Aston, Salt Lake City, UT (US); William M. Decker, Salt Lake City, UT (US); Samuel Drake, Cottonwood Heights, UT (US)

(73) Assignee: FireFly Equipment, LLC, Farmington, UT (US)

( * ) Notice: Subject to any disclaimer, the term of this patent is extended or adjusted under 35 U.S.C. 154(b) by 120 days.

(21) Appl. No.: 13/851,413

(22) Filed: Mar. 27, 2013

(65) Prior Publication Data

US 2013/0255978 A1    Oct. 3, 2013

Related U.S. Application Data

(60) Provisional application No. 61/619,387, filed on Apr. 2, 2012.

(51) Int. Cl.
*A01B 45/04*    (2006.01)

(52) U.S. Cl.
CPC ..................... *A01B 45/04* (2013.01)
USPC ........................................................ 172/19

(58) Field of Classification Search
CPC ............... A01B 45/04; A01B 45/045
USPC ........................................................ 172/19, 20
See application file for complete search history.

(56) References Cited

U.S. PATENT DOCUMENTS

| | | | | |
|---|---|---|---|---|
| 3,807,504 A * | 4/1974 | Nunes, Jr. | | 172/20 |
| 4,616,713 A * | 10/1986 | Shattuck | | 172/19 |
| 4,621,696 A * | 11/1986 | Brouwer | | 172/20 |
| 4,632,192 A * | 12/1986 | Hooks | | 172/19 |
| 4,674,577 A * | 6/1987 | Meyer | | 172/20 |
| 5,064,000 A * | 11/1991 | Dover et al. | | 172/19 |
| 6,112,825 A * | 9/2000 | Hutchison | | 172/19 |
| 7,195,077 B2 * | 3/2007 | Devries | | 172/19 |
| 7,264,063 B1 * | 9/2007 | Dover | | 172/2 |
| 8,336,638 B2 * | 12/2012 | Brouwer et al. | | 172/20 |
| 8,479,835 B2 * | 7/2013 | Brouwer et al. | | 172/1 |
| 2005/0167123 A1 * | 8/2005 | Pohlman et al. | | 172/20 |

OTHER PUBLICATIONS

Trebro Manufacturing, Inc.'s HarveStack Operator's Manual, Oct. 2004.†

(Continued)

*Primary Examiner* — Matthew D Troutman
(74) *Attorney, Agent, or Firm* — Kirton McConkie; Brian Tucker

(57) ABSTRACT

An articulated cutting head and conveyor mount for sod harvesting machines. The invention provides a linkage design that can provide many benefits including: allowing the operator to see the cutting operation, enabling the high lifting of the cutting head for service and maneuvering, managing the vertical bending load of the ground reference roller, providing high transverse stiffness, maintaining the position of the conveyor relative to the cutting head. The linkage design can include fewer parts than previous designs while still being robust and durable. As such, cutting heads employing the linkage design of the present invention can produce higher quality slabs with less service and maintenance than when using current designs.

20 Claims, 5 Drawing Sheets

(56) References Cited

OTHER PUBLICATIONS

Trebro Manufacturing, Inc.'s Parts Detail and Lists for the HarveStack Cutter Head Frame, dated Oct. 15, 2004, and Dec. 15, 2004 and Mar. 8, 2005.†

Screenshots of Trebro Manufacturing, Inc.'s Promotional HarveStack Video, Oct. 2003.†
Turf News Magazine, Advertisement, cover page and p. 24, Mar./Apr. 2006.†

\* cited by examiner
† cited by third party

ARTICULATED CUTTING HEAD AND CONVEYOR MOUNT FOR SOD HARVESTING MACHINES

CROSS-REFERENCE TO RELATED APPLICATIONS

This application claims the benefit of U.S. Provisional Patent Application No. 61/619,387, filed Apr. 2, 2012, titled Articulated Cutting Head And Conveyor Mount.

BACKGROUND

Sod slabs are harvested in a serial manner by a harvesting machine which removes them from the ground continuously. FIG. 1 generally illustrates a typical cutting head 100 used on harvesting machines. As shown, cutting head 100 employs two rollers: a leading compaction roller 101a which presses down on the turf to compact it before it is cut; and a ground reference roller 101b that sets the position of the cutting head with respect to the ground. Other harvesting machines will combine the two roller functions into the ground reference roller, or ignore the turf compacting function in general.

Cutting head 100 also includes a transverse chopping blade or blades 102a which chop the slab to length at the leading edge, which also forms the trailing edge of the preceding slab. Also, to separate the slab from the ground, cutting head 100 includes a cutting blade 102b that reciprocates in the longitudinal direction (i.e. the direction that the harvesting machine moves across the field (or left and right as shown)). Cutting blade 102b may have finger-like extensions 103 that trail behind the blade and lift the slab of turf grass up to the start of a conveyor 104 as the harvesting machine advances.

To produce a quality slab, cutting blade 102b must be positioned in such a manner as to maintain a reasonably uniform thickness of sod along the transverse length of the blade. As the ground where the grass is grown is not perfectly flat, it is important that the cutting head tip from side to side in order to follow the local undulations in the surface of the field. If the cutting head does not tip with the contour of the ground, the slab can have a non-uniform thickness. FIG. 2A illustrates an example of a slab 201 that has a non-uniform thickness across its width. Such variations in the slab thickness transverse to its length can produce tapered rolls which do not roll up properly, adversely affecting the quality of the turf.

Also, cutting blade 102b must be positioned in such a manner as to maintain a reasonably uniform thickness of sod along the longitudinal length of the slab. FIG. 2B illustrates an example of a slab 202 that has a non-uniform thickness along its length. Slabs that vary in thickness longitudinally when stacked produce a pallet that is tipped to one end and thus less stable. Additionally, severe variations in thickness result in slabs that may break apart when handled making the subsequent laying of slabs very difficult.

Conveyor 104 must be positioned with respect to cutting blade 102b so as to properly capture the slab of sod as it comes off of extensions 103. If conveyor 104 is too low it may drag on the ground behind the cut, whereas if it is too high, the slab may fall between conveyor 104 and extensions 103 back onto the ground.

It is also desirable for the cutting head and conveyor to lift high enough off of the ground that, when maneuvering or transporting the harvester, the conveyor and cutting head do not drag on the ground and to facilitate servicing of the cutting head.

Finally, the cutting head needs to be visible to the operator of the harvesting machine to not only initiate the cutting operation, but also to monitor the quality of the product going up the conveyor.

Current cutting head designs have various problems. For example, some cutting heads employ a simple spindle and bearing arrangement to move cutting blade 102b with the contour of the ground. The spindle and bearing arrangement typically pivots forward of the cutting head. Such cutting heads have a ground reference roller that is several inches aft of the spindle and produces a large vertical bending load on the spindle. This leads to a fracture failure of the spindle.

Some designers have attempted to mitigate this problem with a trailing roller that follows a cam track. Others have supported the trailing end of the cutting head with a multiple bar linkage. These designs are often inadequate because the cams and linkages are supported by structures that block the view of the operator.

Also, cam type supports lack strong transverse stiffness which is necessary to prevent some sideways skewing of cutting blade 102b. The support mechanisms used in cam type systems also wear quickly due to sand particle contamination leading to failure of the spindle if not regularly replaced. Additionally, spindle systems lack transverse stiffness. This results in transverse flexing of the cutting head that skews the blade trajectory with respect to the longitudinal direction of travel leaving an undesirable ragged edge on the slab.

Finally, in current designs, the conveyor can generally only be raised a few inches and thus gets damaged by obstacles during field maneuvering and transport. Also, to lift the conveyor, a separate conveyor lifting mechanism is often used. Because separate lifting mechanisms are used for the conveyor and the cutting head, the operator must coordinate the positions of the conveyor and cutting head. Further, if the cutting head and the conveyor are rigidly connected, it is difficult to lift the head high enough for easy service.

BRIEF SUMMARY

The present invention extends to an articulated cutting head and conveyor mount for sod harvesting machines. The invention provides a linkage design that can provide many benefits including: allowing the operator to see the cutting operation, enabling the high lifting of the cutting head for service and maneuvering, managing the vertical bending load of the ground reference roller, providing high transverse stiffness, and maintaining the position of the conveyor relative to the cutting head. The linkage design can include fewer parts than previous designs while still being robust and durable. As such, cutting heads employing the linkage design of the present invention can produce higher quality slabs with less service and maintenance than when using current designs.

In some embodiments, the present invention is implemented as a linkage system for a cutting head of a sod harvesting machine. The linkage system comprises a head boom extending from the sod harvesting machine, and a cutting head frame attached to the head boom by a lower yoke and two support bars. The cutting head frame supports a cutting blade for cutting slabs of sod from the ground.

In some embodiments, the linkage system can include a conveyor that is supported by the cutting head frame which allows the conveyor to be raised and lowered with the cutting head.

This summary is provided to introduce a selection of concepts in a simplified form that are further described below in the Detailed Description. This Summary is not intended to identify key features or essential features of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to an articulated cutting head and conveyor mount for sod harvesting machines. The invention provides a linkage design that can provide many benefits including: allowing the operator to see the cutting operation, enabling the high lifting of the cutting head for service and maneuvering, managing the vertical bending load of the ground reference roller, providing high transverse stiffness, and maintaining the position of the conveyor relative to the cutting head. The linkage design can include fewer parts than previous designs while still being robust and durable. As such, cutting heads employing the linkage design of the present invention can produce higher quality slabs with less service and maintenance than when using current designs.

In some embodiments, the present invention is implemented as a linkage system for a cutting head of a sod harvesting machine. The linkage system comprises a head boom extending from the sod harvesting machine, and a cutting head frame attached to the head boom by a lower yoke and two support bars. The cutting head frame supports a cutting blade for cutting slabs of sod from the ground.

In some embodiments, the linkage system can include a conveyor that is supported by the cutting head frame which allows the conveyor to be raised and lowered with the cutting head.

Figure 1:
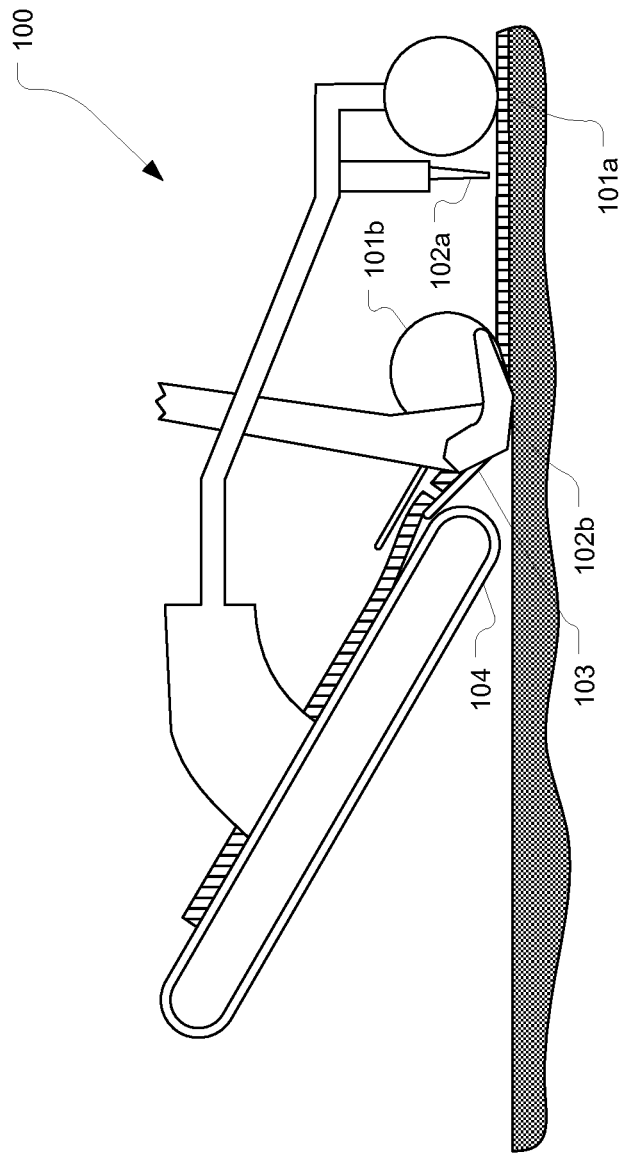
FIG. 1 illustrates an example of a cutting head used by prior art harvesting machines.
Figure 2A:
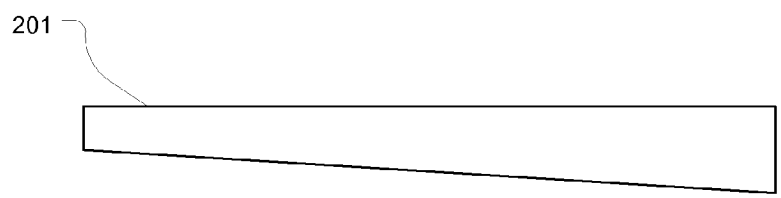
FIGS. 2A and 2B illustrate slabs of sod that have a non-uniform thickness along the width and length respectively of the slabs.
Figure 2B:
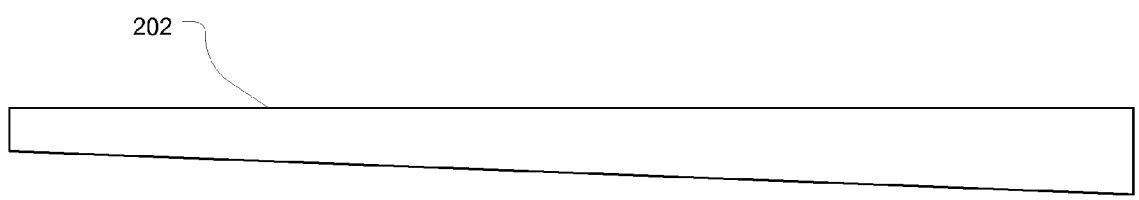
Figure 3:
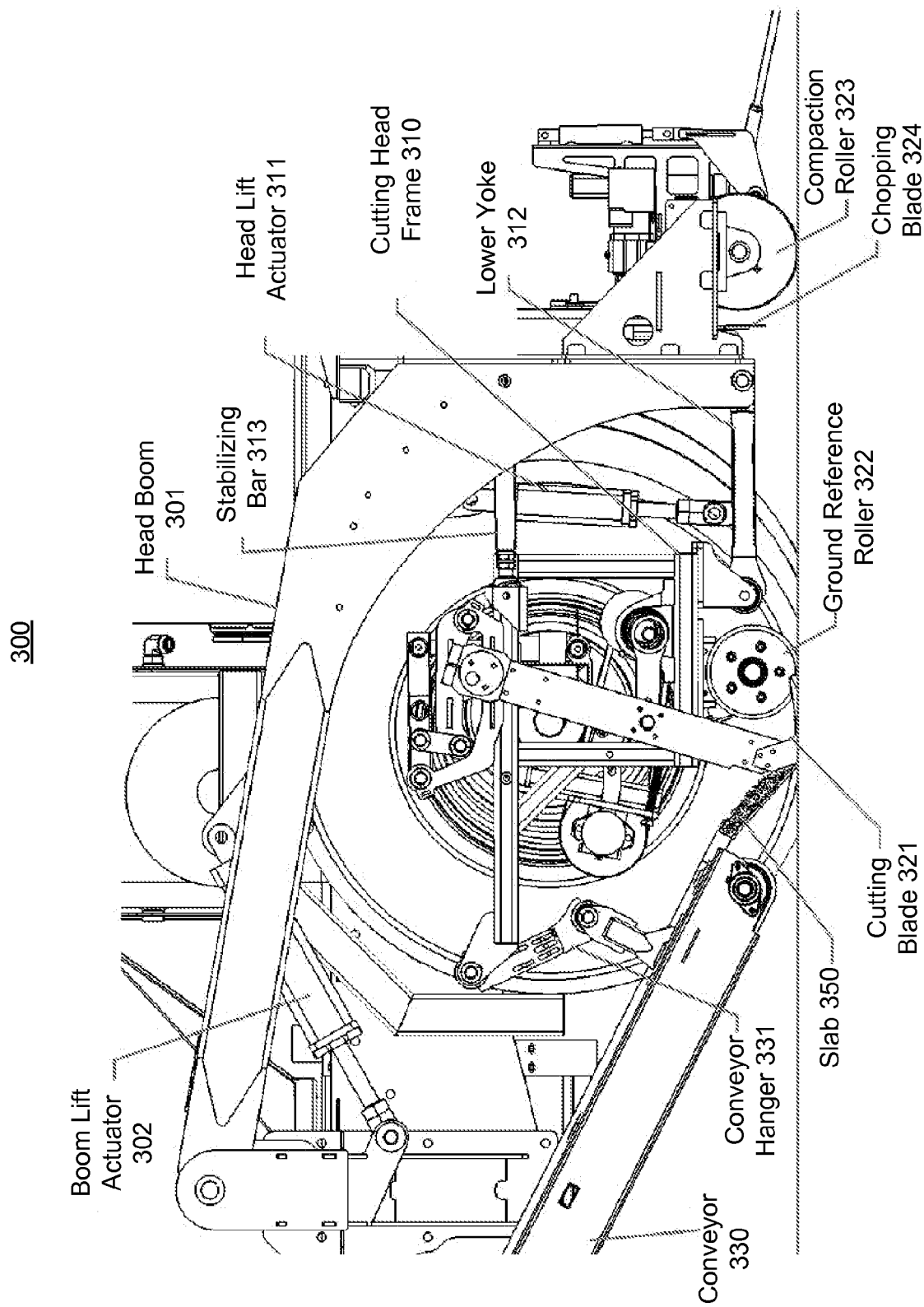
FIG. 3 illustrates an example of a cutting head that includes a linkage in accordance with the present invention.

FIG. 3 illustrates an example of a cutting head 300 that includes a linkage in accordance with the present invention. As shown, cutting head 300 is supported from the frame of the harvesting machine by head boom 301. Head boom 301 is raised and lowered by boom lift actuator 302. A compaction roller 323 and chopping blade 324 are connected to head boom 301. Head lift actuator 302 can be adjusted to control the vertical position of cutting head 300.

Cutting head 300 includes cutting head frame 310 that supports a cutting blade 321 and a ground reference roller 322. Slabs cut by cutting blade 321 are fed to conveyor 330 which is supported from cutting head frame 310 by a conveyor hanger 331. Cutting head 300 is connected to head boom 301 by lower yoke 312 and stabilizing bars 313.

Figure 4:
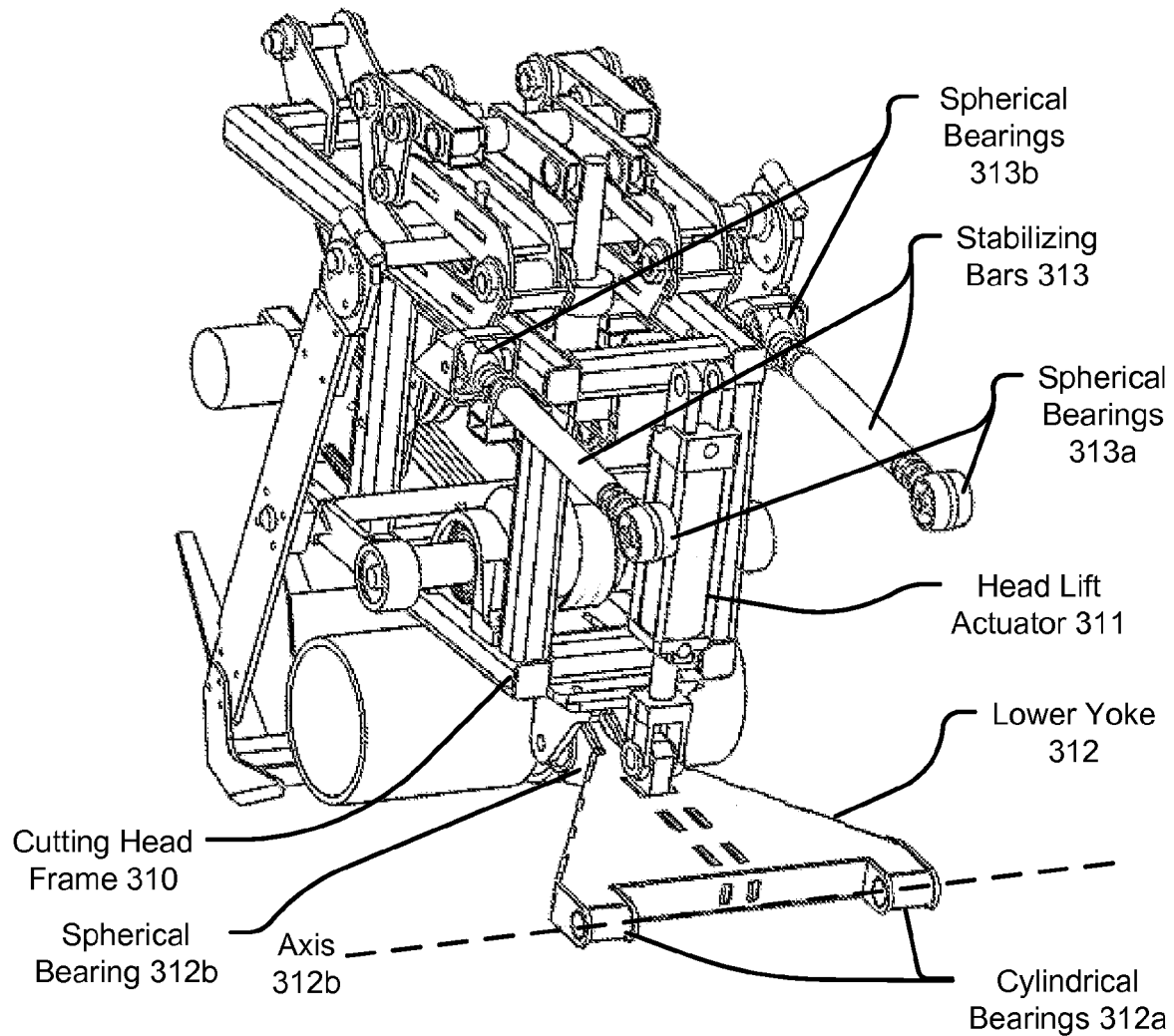
FIG. 4 illustrates another view of a cutting head which identifies the various components of the linkage of the present invention.

FIG. 4 illustrates another view of cutting head 300 which identifies the various components of the linkage of the present invention. In FIG. 4, head boom 301 is not shown so that the remaining components of the linkage are fully visible.

As shown, the linkage of the present invention is a five bar linkage system consisting of: (1) head boom 301 forming a first vertical bar; (2) cutting head frame 310 forming a second vertical bar; (3) lower yoke 312 forming a first horizontal bar; (4) a first stabilizing bar 313 forming a second horizontal bar; and (5) a second stabilizing bar 313 forming a third horizontal bar.

As shown in FIG. 3, head boom 301 extends vertically opposite cutting head frame 310. As shown in FIGS. 3 and 4, lower yoke 312 and stabilizing bars 313 extend between head boom 301 and cutting head frame 310. This configuration of the five bar linkage system provides many benefits.

Lower yoke 312 is connected to head boom 301 via cylindrical bearings 312a on either side of the yoke. Cylindrical bearings 312a allow lower yoke 312 to pivot vertically about an axis 312b that is transverse to the cutting direction of the harvesting machine. This allows cutting head frame 310 (and therefore, the other components of cutting head 300) to move up and down with respect to compaction roller 323 (shown in FIG. 3). Lower yoke 312 is connected to cutting head frame 310 by a spherical bearing 312b which allows cutting head frame 310 to tilt from side to side and to rotate as lower yoke 312 moves up and down.

Stabilizing bars 313 are attached to head boom 301 and to the sides of cutting head frame 310 via spherical bearings 313a and 313b respectively. This configuration allows cutting head frame 310 to freely twist from side to side as well as up and down. This configuration also limits the forward and backward movement of cutting head frame 310 to pivoting around an axis of ground reference roller 322.

By limiting the forward and backward movement of cutting head frame 310 to only movement around the axis of ground reference roller 322, the bending moment of cutting head frame 310 is reacted around the trailing spherical bearing 312b of lower yoke 312 thereby greatly reducing the stress on the remaining portions of the linkage system. In other words, if the cutting head frame comprises a signal bar, all bending stress is applied to the single bar. However, by using cutting head frame 310 which provides lower yoke 312 and stabilizing bars 313 to support the remaining structure, the bending stress is spread across the three bars. Also, because lower yoke 312 and stabilizing bars 313 are separated by a substantial distance, the bending moment is greatly reduced.

Returning to FIG. 3, cutting head 300 is shown in a down (or cutting) position. In this position, conveyor 330 is positioned adjacent to the extensions from cutting blade 321 so that slabs are routed onto conveyor 330 after being cut. In this position, conveyor hanger 331 maintains conveyor 330 in the appropriate vertical position with respect to cutting head frame 310. The design of conveyor hanger 331 also limits the forward and backward movement of conveyor 330 when cutting head frame 310 moves during the cutting operation.

Figure 5:
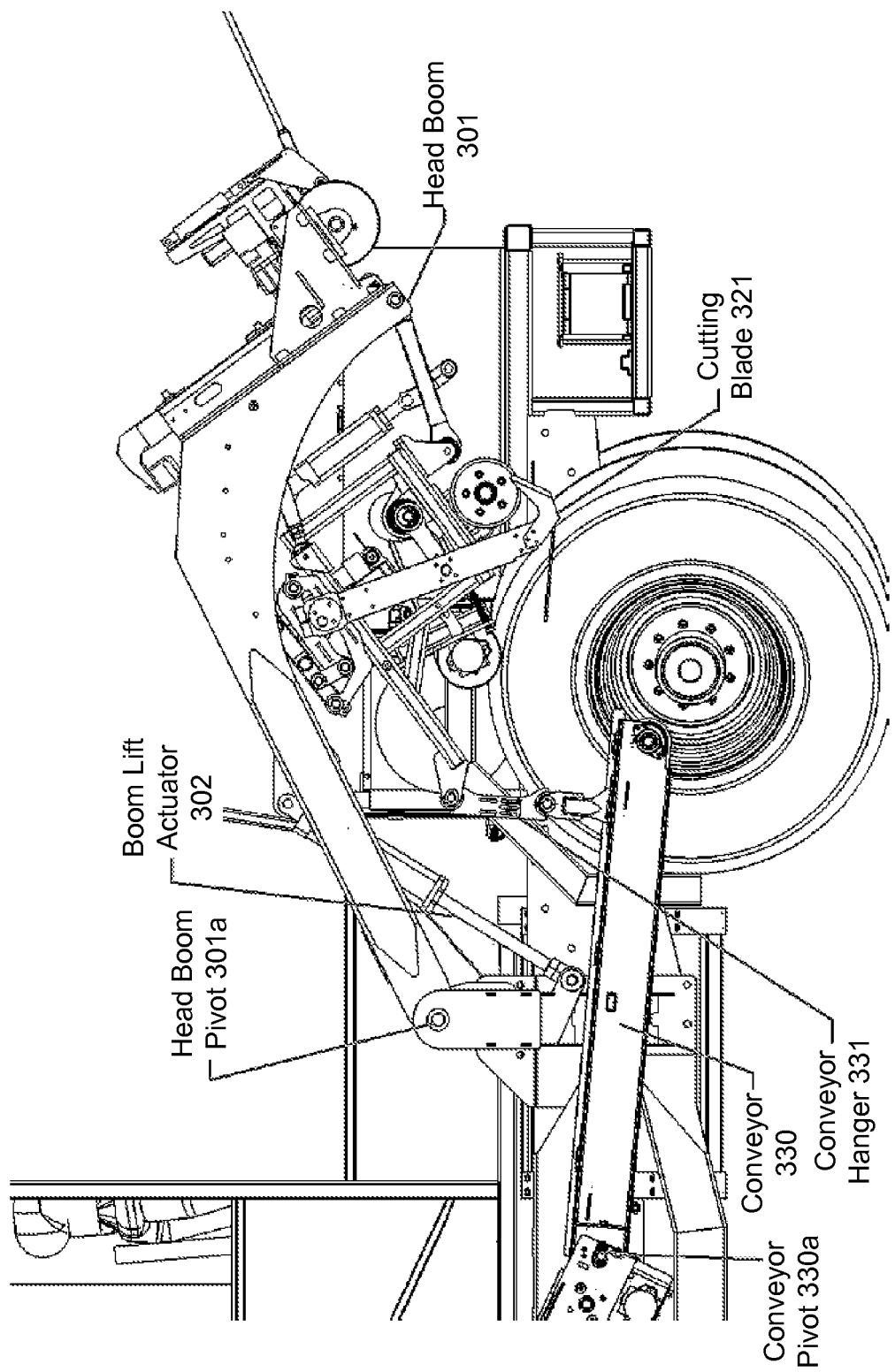
FIG. 5 illustrates the cutting head of claim 3 in a raised position.

FIG. 5 illustrates cutting head 300 and conveyor 330 in a lifted position. As shown, head boom 301 is lifted by extending boom lift actuator 302. This lifting causes head boom 301 to pivot around head boom pivot 301*a* thereby lifting the remaining components of the system. Because conveyor hanger 331 is connected to cutting head frame 310, as cutting head frame 310 lifts, conveyor 330 also lifts pivoting around conveyor pivot 330*a*. The design of conveyor hanger 331 causes the distance between cutting blade 321 and conveyor 330 to increase as head boom 301 is lifted. The lifting provides adequate clearance between conveyor 330 and obstacles on the ground. For example, in some embodiments, conveyor 330 can be lifted to a generally horizontal position.

This lifting also facilitates service of the components of cutting head 300. For example, cutting blade 321 can be lifted substantially off the ground to allow a technician to easily access the blade or other components of cutting head 300.

The five bar linkage system provides many benefits. For example, the spherical bearings 312*b*, 313*a*, and 313*b* allow cutting head 300 to follow the surface of the ground to produce a slab having a consistent thickness. In other words, the spherical bearings allow cutting head frame 310 to tilt and rotate as necessary to maintain cutting blade 321 at a consistent distance below the surface of the turf.

Also, because the position of conveyor 330 is tied to the position of cutting head frame 310 (via conveyor hanger 331), the conveyor 330 remains in the appropriate position without requiring controls for separately controlling the position of the conveyor. Conveyor hanger 331 also causes conveyor 330 to lift with cutting head 300 thereby providing easier access to cutting blade 321 and chopping blade 324 (which require relatively frequent maintenance).

Additionally, boom pivot 301*a* and conveyor hanger 331 are positioned so that the operator's view of cutting head 300 is not obscured. Because of the design of the five bar linkage system, which provides significant strength and durability, the relatively small boom pivot 301*a* and conveyor hanger 331 can be used in place of traditional bulky support structures which obscure the operator's vision.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A linkage system for a cutting head of a sod harvesting machine, the linkage system comprising:
   a head boom extending from the sod harvesting machine;
   a cutting head frame supporting a cutting blade for cutting slabs of sod from the ground;
   two support bars that each have a first end that connects to the cutting head frame via a spherical bearing and a second end that connects to the head boom; and
   a lower yoke that has a first end that connects to the cutting head frame via a spherical bearing and a second end that connects to the head boom.

2. The linkage system of claim 1, wherein the second end of the lower yoke is connected to the head boom by one or more cylindrical bearings which allow the lower yoke to pivot up and down about an axis formed through the one or more cylindrical bearings.

3. The linkage system of claim 2, wherein the spherical bearings allow the cutting head frame to tilt from side to side as the lower yoke moves up and down.

4. The linkage system of claim 1, wherein the first ends of the two support bars are connected to opposite sides of the cutting head frame, and the second ends of the two support bars are connected to the head boom by spherical bearings thereby allowing the cutting head frame to twist from side to side and up and down.

5. The linkage system of claim 4, wherein the cutting head frame further supports a ground reference roller that is positioned in front of the cutting blade, and wherein the two support bars constrain the forward and backward movement of the cutting head frame to forward and backward movement around an axis of the ground reference roller.

6. The linkage system of claim 1, wherein the head boom includes a boom lift actuator which lifts the head boom and, as a result, lifts the cutting head frame.

7. The linkage system of claim 1, further comprising:
   a head lift actuator connected between the head boom and the lower yoke, wherein the head lift actuator is adjustable to lift and lower the cutting head frame.

8. The linkage system of claim 1, further comprising:
   a conveyor that is connected at one end to the harvesting machine and at the other end to the cutting head frame.

9. The linkage system of claim 8, wherein the conveyor is connected to the cutting head frame by a conveyor hanger that causes the conveyor to be positioned adjacent to the cutting blade when the cutting head frame is lowered, and causes the distance between the conveyor and the cutting blade to increase when the cutting head frame is raised.

10. The linkage system of claim 9, wherein the conveyor hanger includes two pivot points.

11. The linkage system of claim 10, wherein a portion of the conveyor hanger between the two pivot points extends downwardly and forwardly from the cutting head frame when the cutting head frame is lowered.

12. The linkage system of claim 11, wherein the portion of the conveyor hanger between the two pivot points extends vertically from the cutting head frame when the cutting head frame is raised.

13. A linkage system for a cutting head of a sod harvesting machine, the linkage system comprising:
   a head boom having a pivoting connection for connecting the head boom to a sod harvesting machine, the head boom having a horizontal portion that extends from the pivoting connection and a vertical portion that extends downwardly from the horizontal portion;
   a cutting head frame supporting a cutting blade for cutting slabs of sod from the ground;
   two support bars that each have a first end that connects to the cutting head frame via a spherical bearing and a second end that connects to the vertical portion of the head boom;
   a lower yoke that has a first end that connects to the cutting head frame via a spherical bearing and a second end that connects to the vertical portion of the head boom; and
   a conveyor having a first and second end, the first end being pivotally connected to the sod harvesting machine and the second end being supported by the cutting head frame.

14. The linkage system of claim 13, wherein the second end of the lower yoke is connected to the vertical portion of the head boom by one or more cylindrical bearings which allow the lower yoke to pivot up and down about an axis formed through the one or more cylindrical bearings.

15. The linkage system of claim 14, wherein the spherical bearings allow the cutting head frame to tilt from side to side as the lower yoke moves up and down.

16. The linkage system of claim 13, wherein the first ends of the two support bars are connected to opposite sides of the cutting head frame, and the second ends of the two support bars are connected to the vertical portion of the head boom by spherical bearings thereby allowing the cutting head frame to twist from side to side and up and down.

17. The linkage system of claim 16, wherein the cutting head frame further supports a ground reference roller that is positioned in front of the cutting blade, and wherein the two support bars constrain the forward and backward movement of the cutting head frame to forward and backward movement around an axis of the ground reference roller.

18. The linkage system of claim 13, wherein the conveyor is attached to the cutting head frame by a conveyor hanger that pivots to cause the conveyor to be positioned adjacent to the cutting blade when the cutting head frame is lowered, and pivots to cause the conveyor to be positioned away from the cutting blade when the cutting head is raised.

19. The linkage system of claim 13, further comprising:
a boom lift actuator attached to the sod harvesting machine at one end and to the head boom at the other end, the boom lift actuator extending to lift the head boom which causes the cutting head frame to lift from the ground.

20. The linkage system of claim 13, further comprising:
a head lift actuator connected to the head boom and the lower yoke, the head lift actuator extending and contracting to lower and raise the cutting head frame.

* * * * *